(12) United States Patent
Li et al.

(10) Patent No.: US 10,585,953 B1
(45) Date of Patent: Mar. 10, 2020

(54) MIGRATING IMAGE HISTORIES BETWEEN DIFFERENT DATABASES

(71) Applicant: SHUTTERSTOCK, INC., New York, NY (US)

(72) Inventors: Xinyu Li, Jersey City, NJ (US); Xiru Sun, Jericho, NY (US); Zheng Qin, Great Neck, NY (US); Garvin M. Reid, New York, NY (US); Alexandra Arriola Zusman, Garrison, NY (US)

(73) Assignee: SHUTTERSTOCK, INC., New York, NY (US)

( * ) Notice: Subject to any disclaimer, the term of this patent is extended or adjusted under 35 U.S.C. 154(b) by 201 days.

(21) Appl. No.: 15/859,204

(22) Filed: Dec. 29, 2017

(51) Int. Cl.
*G06F 17/30* (2006.01)
*G06F 16/951* (2019.01)
*G06F 21/10* (2013.01)
*G06K 9/62* (2006.01)
*G06F 16/583* (2019.01)

(52) U.S. Cl.
CPC ........ *G06F 16/951* (2019.01); *G06F 16/5838* (2019.01); *G06F 21/10* (2013.01); *G06K 9/6267* (2013.01)

(58) Field of Classification Search
CPC ..... G06F 16/951; G06F 16/5838; G06F 21/10
USPC .................................................. 707/600–899
See application file for complete search history.

(56) References Cited

U.S. PATENT DOCUMENTS

2018/0300714 A1* 10/2018 Lieberman .......... G06F 3/04845

* cited by examiner

*Primary Examiner* — Isaac M Woo
(74) *Attorney, Agent, or Firm* — McDermott Will & Emery LLP

(57) ABSTRACT

A method for receiving an activation request for an application element installed in a client device is provided. The method includes identifying one or more images from a first image database selected by a user in the client device and performing a reverse image search to identify one or more images in a second image database that are visually similar to the images from the first image database. The method also includes providing the one or more images in the second image database to the user via the client device and adding a user-selected image from the one or more images in the second image database to a collection in the second image database, the collection being associated with the user.

20 Claims, 14 Drawing Sheets

```
                                                                      ┌─ 700
702 ─┐
┌──────────────────────────────────────────────────────────────────────────────┐
│ Access, with an application installed in a client device, an image search    │
│ engine in a first image database or a web page that includes a licensing     │
│ history for a user                                                            │
└──────────────────────────────────────────────────────────────────────────────┘
704 ─┐                              ▼
┌──────────────────────────────────────────────────────────────────────────────┐
│ Activate an application element installed in the application based on an      │
│ image selection from the first image database                                 │
└──────────────────────────────────────────────────────────────────────────────┘
706 ─┐                              ▼
┌──────────────────────────────────────────────────────────────────────────────┐
│ Access, in a second image database, a display of multiple images that are    │
│ visually similar to the image selection from the first image database         │
└──────────────────────────────────────────────────────────────────────────────┘
708 ─┐                              ▼
┌──────────────────────────────────────────────────────────────────────────────┐
│ Add one or more images of the multiple images from the second image          │
│ database to a user collection in the second image database                    │
└──────────────────────────────────────────────────────────────────────────────┘
```

MIGRATING IMAGE HISTORIES BETWEEN DIFFERENT DATABASES

BACKGROUND

Field

The present disclosure generally relates to data migration between different databases. More specifically, the present disclosure relates to image transfer between different databases having different license of use agreements with registered users.

Description of the Related Art

Image search engines are a powerful tool for users who tend to accrue large stocks of images in personalized accounts. Most of the images that users accrue over a search history have license agreements issued to the user on behalf of the image search engine host. When a user desires to switch to a different image search engine provider, the license agreements prevent the user from simply transferring the image stocks in the personal account from the first search engine host to the new search engine host. This becomes a deterrent for the user to in fact switch to a different image search engine, regardless of other competitive advantages. Moreover, a user that is registered with a given image search engine provider may often use third party search engine tools to find desired images. In some instances, the desired images are subject to license agreement restrictions that may prevent the user to download and modify a desired image. This may discourage users from exploring different search possibilities, ultimately increasing user frustration with an image search engine provider.

SUMMARY

In one embodiment of the present disclosure, a computer-implemented method is described for receiving an activation request for an application element installed in a client device. The computer-implemented method includes identifying one or more images from a first image database selected by a user in the client device, and performing a reverse image search to identify one or more images in a second image database that are visually similar to the images from the first image database. The computer-implemented method also includes providing the one or more images in the second image database to the user via the client device, and adding a user-selected image from the one or more images in the second image database to a collection in the second image database, the collection being associated with the user.

According to one embodiment, a system is described that includes one or more processors and a memory coupled to the one or more processors, the memory including instructions that, when executed by the one or more processors, cause the one or more processors to receive an activation request for an application element installed in a client device, and to identify one or more images from a first image database selected by a user in the client device. The one or more processors execute the instructions to perform a reverse image search to identify one or more images in a second image database that are visually similar to the images from the first image database, to provide the one or more images in the second image database to the user via the client device, and to add a user-selected image from the one or more images in the second image database to a collection in the second image database, the collection being associated with the user.

According to one embodiment, a non-transitory, machine readable medium is described that includes instructions, which when executed by one or more processors, cause a computer to perform a method for receiving an activation request for an application element installed in a client device. The method includes identifying one or more images from a first image database selected by a user in the client device, and performing a reverse image search to identify one or more images in a second image database that are visually similar to the images from the first image database. The method also includes providing the one or more images in the second image database to the user via the client device, and adding a user-selected image from the one or more images in the second image database to a collection in the second image database, the collection being associated with the user.

In yet other embodiment, a system is described that includes a means for storing commands and a means for executing the commands causing the system to perform a method that includes receiving an activation request for an application element installed in a client device. The method includes identifying one or more images from a first image database selected by a user in the client device, and performing a reverse image search to identify one or more images in a second image database that are visually similar to the images from the first image database. The method also includes providing the one or more images in the second image database to the user via the client device, and adding a user-selected image from the one or more images in the second image database to a collection in the second image database, the collection being associated with the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
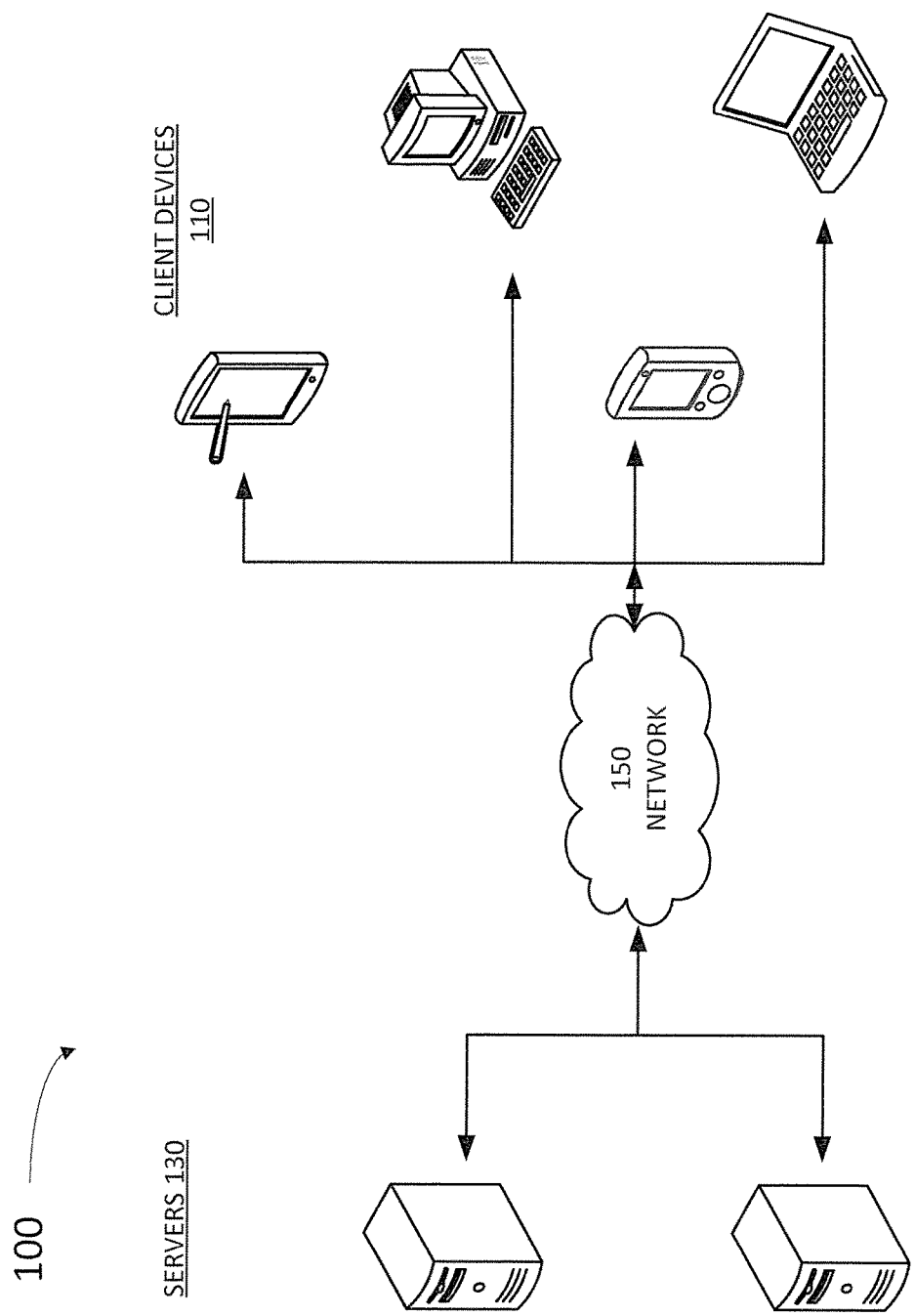
FIG. 1 illustrates an example architecture suitable for migrating images between a first image database and a second image database, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and a label, or a search query associated with an image for identifying the image.

The present disclosure relates to image transfer between different databases having different license of use agreements with registered users. Thus, a user having a large stock of licensed proprietary images in a personal account with a first image database may smoothly transfer the stock to a second image database without loss of valuable information accrued over time using a former image search engine. Moreover, in some embodiments a user may find a desirable image with a third party image search tool, where proprietary agreements prevent the user from downloading the image. In such instances, systems and methods as disclosed herein enable the user to download, with the image search engine to which the user is subscribed, an image that closely resembles the desirable, but restricted, image.

Embodiments as disclosed herein provide a solution to the problem arising in the realm of computer technology and network search engines of migrating previously licensed images and other data from third-party websites to the host of an image search engine interested in attracting new users and growing its network. Tools as disclosed herein help users to automatically retain and migrate their personal licensing history from a third-party website to image search engine hosts interested in attracting new users.

The subject system provides several advantages, including a feature for automatically finding, within a webpage accessed by a user with a browser, images belonging to a personal licensing history of the user and other images that may be of interest for the user. In addition, some embodiments include an application element tool that initiates a search for related images in a second image database upon activation by the user. In some embodiments, the application element tool may include a plugin attached to the application.

The proposed solution further provides improvements to the functioning of the computer itself because it reduces image search time and processing when the target of the image search is another image already selected by the user according to best preferences, rather than a shortened textual query.

Embodiments disclosed herein include tools for migrating user licensing history of potential users from competitor websites to an image search engine host using reverse image search technology. In reverse image search technology the image search engine finds licensed images that are visually similar to a selected image, wherein the selected image is restricted for its use by the image search engine host, whereas the licensed images are not. Given a potential user licensing history on a third-party website, tools as disclosed herein can automatically find visually similar, often identical images that can be added to a potential user account with the image search engine host.

Embodiments as disclosed herein combine technology to gather images from one or more websites with technology to search for visually similar images given an image (e.g., reverse image search) to provide a powerful tool that is attractive to current and potential users of image search engine services. Some embodiments include tools to automatically gather images from a third party webpage that includes a licensing history of a potential user. Also, in some embodiments the tools automatically search for visually similar images on a second image database (e.g., including appropriately licensed images) given an image from the third party webpage.

Example System Architecture

FIG. 1 illustrates an example architecture 100 for an image search engine suitable for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to perform a reverse image search using as targets an image previously selected by a user of client device 110 from a third party website. The target image may be retrieved from a license history of the user, which may be stored in a history log in a memory of the server hosting the third party website. The processor in server 130 associates a first image vector to the target image from the third party website. Accordingly, the processor may use a suitably trained neural network (NN) algorithm to find the projections of the first image vector along dimensions in an embedded space, the dimensions associated with style classifications defined by the NN algorithm based on prior image searches. The processor may also be configured to find a second image vector "close" to the first image vector, the second image vector associated with a licensed image in a second image database. For purposes of load balancing, multiple servers 130 can host memories including instructions to one or more processors, and multiple servers 130 can host a history log and the second image database.

Servers 130 may include any device having an appropriate processor, memory, and communications capability for hosting the history log, the image database, and an image search engine. The image search engine may be accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine and the history log on one or more of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
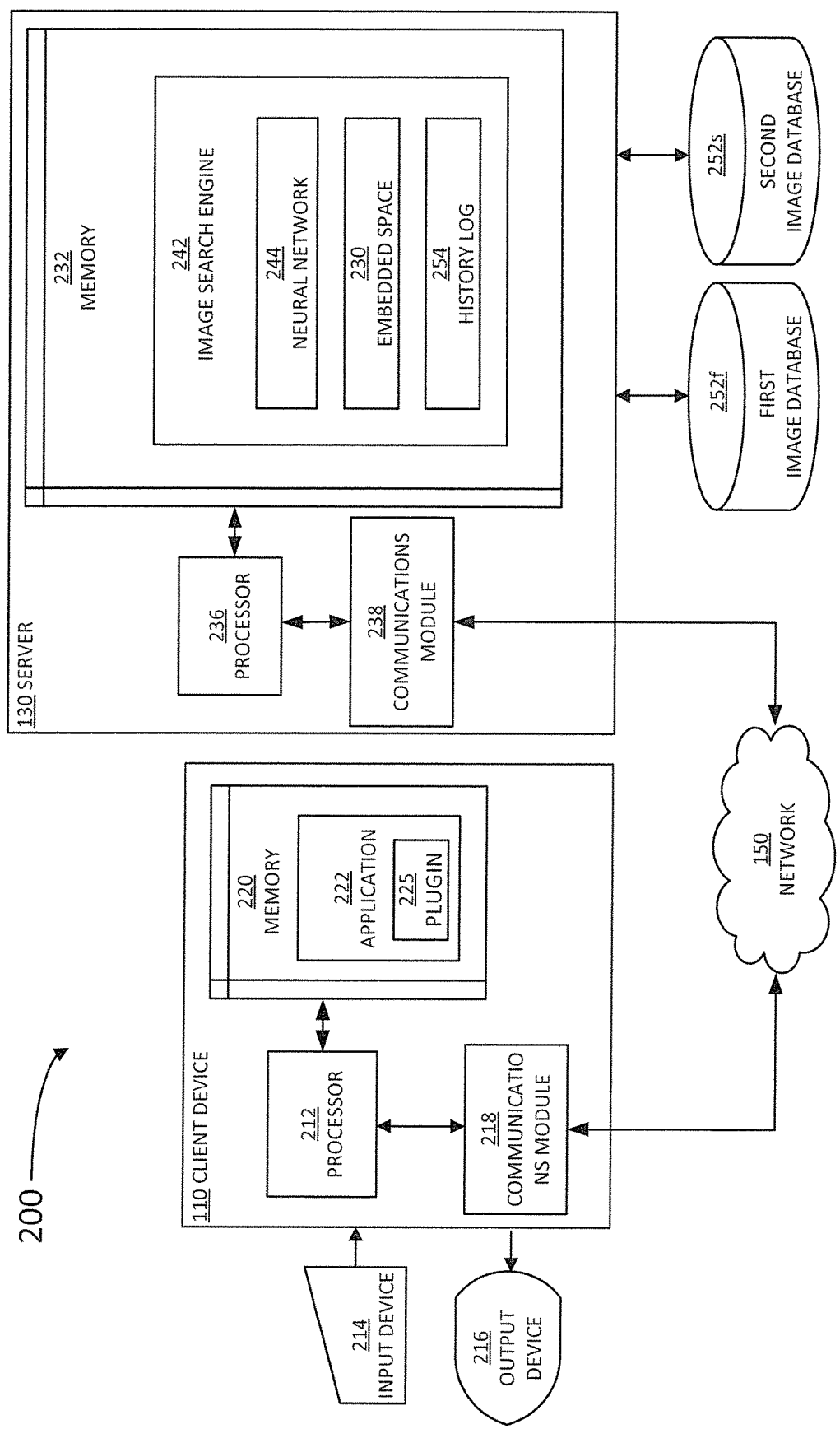
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and communications module 238. Processor 236 is configured to execute instructions, such as instructions physically coded into processor 236, instructions received from software in memory 232, or a combination of both. Memory 232 includes an image search engine 242 for searching images stored in a first image database 252f or in a second image database 252s (hereinafter, collectively referred to as "image databases 252"). A user may access image search engine 242 through an application 222 or a web browser installed in client device 110. Accordingly, application 222 may be installed by server 130 and perform scripts and other routines provided by server 130. Further, in some embodiments server 130 may install an application element 225 in application 222. Plugin 225 may be configured to activate image search engine 242 in a reverse image search mode, upon activation by the user of client device 110. Execution of application 222 and activation of application element 225 may be controlled by a processor 212 in client 110.

Image databases 252 can be, for example, a dataset associated with images corresponding to a number of style classes (e.g., about 25 or more). In one or more implementations, image databases 252 represent databases that contain, for each image, a mapping from an image identifier to a vector in an embedded space 230, wherein the image identifier is associated with a location of the image in the database (e.g. first image database 252F, or second image database 252S). A user of client device 110 having an application 222 installed by, and registered with, server 130, may have a personal account in one of image databases 252, storing multiple images previously selected by the user. The personal account for each user may be handled through a history log 254 in memory 232, wherein the image searches of each user may be registered by server 130.

Image databases 252 typically include a large number of images (e.g., about 50 million, or more). Further, images in image databases 252 may include proprietary information about the owner of the image and the rights and license agreements to which a third party is bound when accessing the image (e.g., through network 150). For example, in some embodiments, first image database 252f may be handled by a remote server that is different from server 130, and image database 252s may be handled by server 130. Accordingly, the user may have licensing rights to images in second image database 252s but not to at least some images in first image database 252f. Accordingly, the user may be interested in obtaining images from second image database 252s that are visually similar to one or more images from first image database 252f.

For example, in some embodiments the user of client device 110 may be transitioning from an image search engine hosting first image database 252f to an image search engine in server 130, hosting second image database 252s. Accordingly, the user may be interested in creating a personal account with server 130 using images from second image database 252s that are visually similar to images in a personal account registered with the server that handles first image database 252f.

Embedded space 230 is a multi-dimensional vector space wherein each dimension corresponds to a style class for an image. Accordingly, a vector projection over each dimension indicates, for a given image, a degree to which the image includes or represents said style class. A style class may be defined by an image caption, or some other textual description of a semantic concept that is useful to distinguish one image from another, or classify two images as visually similar. The quantification of the number and type of style classifications, and the projection of image vectors on each of the style classifications for any given image, may be performed by training a non-linear algorithm such as a NN 244, which is stored in memory 232. The training of NN 244 is enhanced every time a user activates image search engine 242, through data saved in history log 254. In some embodiments, image search engine 242 is configured to associate an image from first image database 252F with a visually similar image from second image database 252S using neural network 244.

NN 244 may include a language neural network (LNN), a deep neural network (DNN), or a convolutional neural network (CNN). In some embodiments, NN 244 may include a neural network configured as a vision model. In a DNN vision model as disclosed herein is trained as a feature extractor which maps variable sized images in the image database into image vectors in the embedded space, having a predetermined vector dimension. The DNN vision model is trained in a supervised manner in which the DNN vision model may be a classifier. In some embodiments, the DNN vision model could be trained purely unsupervised. The DNN vision model may also be trained using semi-supervised techniques in which each image has possibly multiple soft labels. Accordingly, the DNN vision model is trained to form an image vector in embedded space 230 by selecting a fixed-length subset of the neural network activations such that there is a fixed mapping from images to the image vector in the embedded space (e.g., the fixed-length subset of network activations has a length equal to the pre-selected vector dimension of the embedded space).

In certain aspects, processor 236 is configured to determine data for interaction history 254 by obtaining user interaction data identifying interactions with images from image search results that are responsive to search queries. For example, processor 236 may determine that a user interacted with an image from a search result, such as by clicking on the image, saving the image for subsequent access, or downloading the image to a client (e.g., client 110), or the like. Processor 236 may keep track of user interactions with a number of images over a given time period, to build interaction history 254. In some embodiments, interaction history 254 may also include data indicating search behavior (and/or patterns) relating to prior image search queries by one or multiple users. Interaction history 254, image search engine 242, and at least one of image databases 252 may be part of the same memory 232 in server 130. In some embodiments, image search engine 242 and at least one of image databases 252 may be hosted in a different server that is accessible by server 130.

Figure 3:
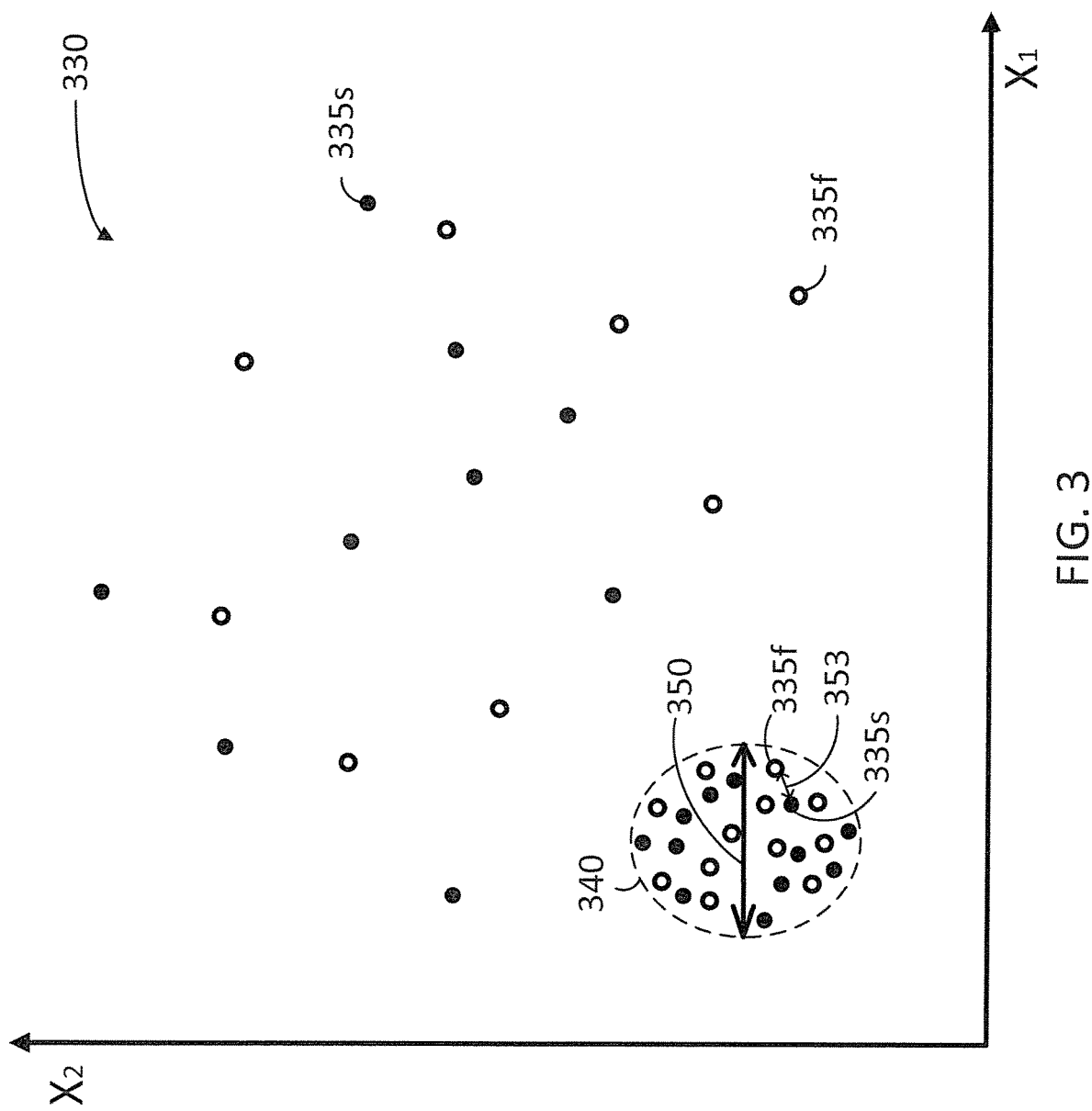
FIG. 3 illustrates a vector space with embedded images for a reverse image search, according to some embodiments.

FIG. 3 illustrates an embedded space 330 with image vectors 335f and 335s (hereinafter, collectively referred to as "image vectors 335") for a reverse image search, according to some embodiments. For illustrative purposes, only the projection of embedded space 330 on two dimensions, $X_1$, in the abscissae and $X_2$, in the ordinates, are illustrated. Image vectors 335f may be associated with images in first image database 252f, and image vectors 335s may be associated with images in second image database 252s.

Embedded space 330 may be formed by NN 244 using history log 254. Further, embedded space 330 may be stored in memory 232 (e.g., embedded space 230), or may be external to memory 232 and directly or remotely accessible to image search engine 242. The values for $X_1$ and $X_2$, for each of image vectors 335 are selected according to NN 244. In some embodiments, NN 244 is configured so that vectors 335 associated with visually similar images are located, or "clustered," in close proximity to each other in embedded space 330, wherein a distance, D 353, between any two image vectors 335 ('A,' and 'B') may be defined as a "cosine" distance, D. In some embodiments, and without limitation, a cosine distance between two vectors, A, and B, regardless of the dimensions of the vectors, may be obtained from the mathematical expression $$D = 1 - \frac{A \cdot B}{|A||B|}, \quad (1)$$

where the "dot" product "•" may be suitably defined for the vector space that includes vectors A and B, and |A| and |B|, are generally "lengths" associated to vectors A and B, respectively, in the vector space.

Accordingly, embedded space 330 may include a cluster 340 of image vectors 335 that are within a threshold distance (T) 350 within each other. Therefore, it is expected that image vectors 335 within cluster 340 are visually similar to one another. Moreover, the closer the cosine distance D 353, the more visual similarity between two image vectors 335 will be expected.

FIGS. 4A-D illustrate a walk-through example of the use of an application 422 for migrating a specific image from a first image database 452f to a second image database 452s (collectively referred to, hereinafter, as image databases 452), according to some embodiments.

Figure 4A:
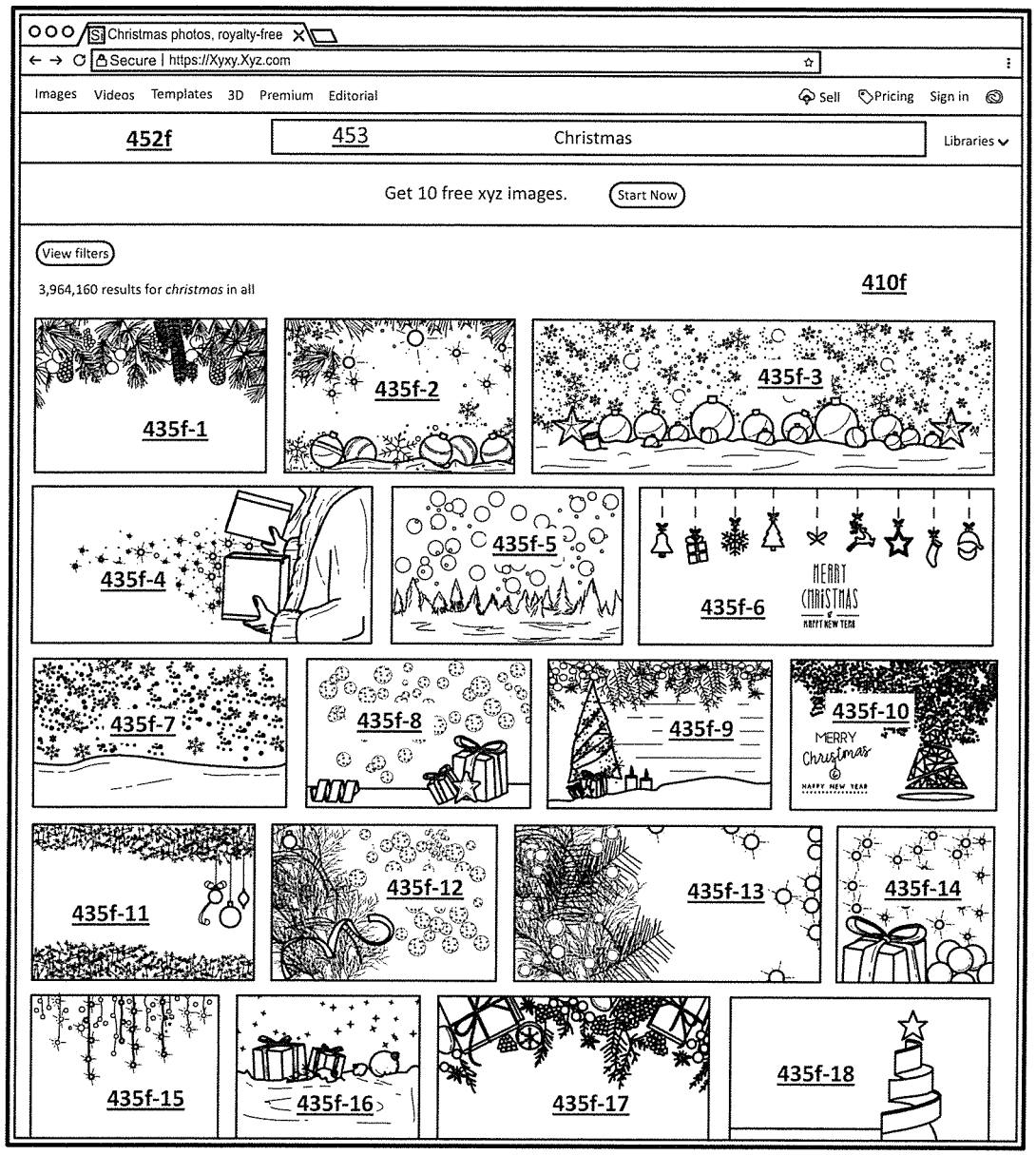
FIGS. 4A-D illustrate a walk-through access of an application element in an application for migrating a specific image from a first database to a second database, according to some embodiments.

FIG. 4A illustrates a web page 410f of first image database 452f accessed by a user (e.g., first image database 252f). Web page 410f displays multiple images 435f-1, through 435f-18 that belong to first image database 452f. In some embodiments, images 435f-1 through 435f-18 may be the result of a user search query 453 (e.g., "Christmas") performed by the user, accessing the first image database with the client device.

Figure 4B:
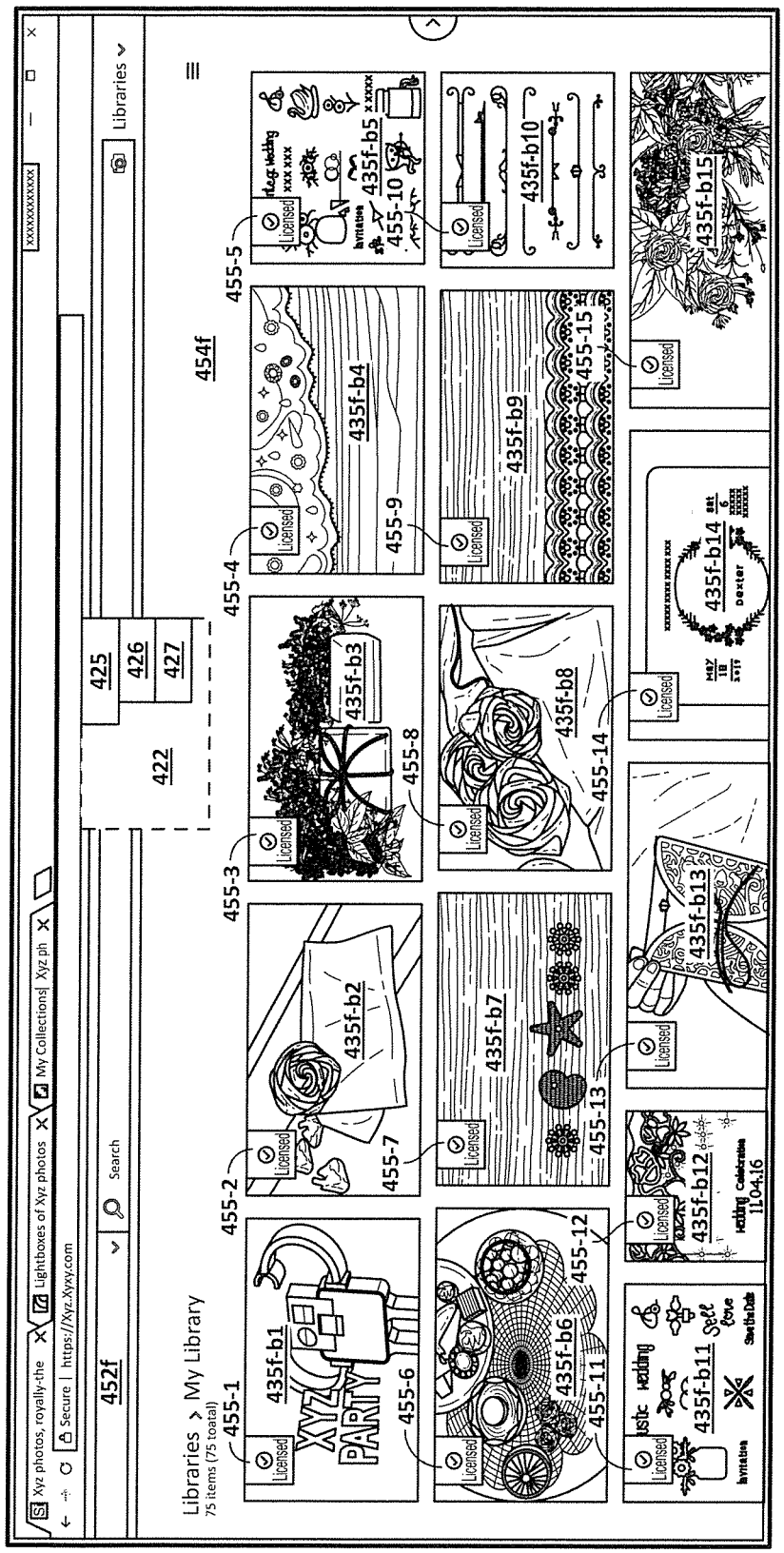

FIG. 4B illustrates a web page 454f including images from a user's licensing history at the website of first image database 452f. Accordingly, the user may have a private account with the first image database and may log in to the private account to access images stored in the personal licensing history for the user. Images 534f-b1 through 435f-b15 may be images that the user has retrieved in prior searches in the first image database, and for which the user may have a license for use 455-1 through 455-15 (hereinafter, collectively referred to as "licenses 455"), according to terms and agreements between the user and the server hosting first image database 452f. In some embodiments, the application is configured to automatically inspect the web page of first image database 452f to look for images therein (which may or may not be licensed to the user). Moreover, in some embodiments, the application is configured for filtering the images from first image database 452f. For example, the application may search first image database 452f for images excluding images that are too small (e.g., logos and other minor ancillary details and decorations in the web page). The web browser accessing and displaying web page 454f may also include application element 425 (e.g., plugin) as part of an application 422 running in the background. Application element 425 may include a pull down menu with a "select all" option 426, or a "select image" option 427. Accordingly, when the user selects option 426, application 426 facilitates a reverse image search of all images 534f-b in the user history log, without having to browse through several pages of images in the history log.

Figure 4C:
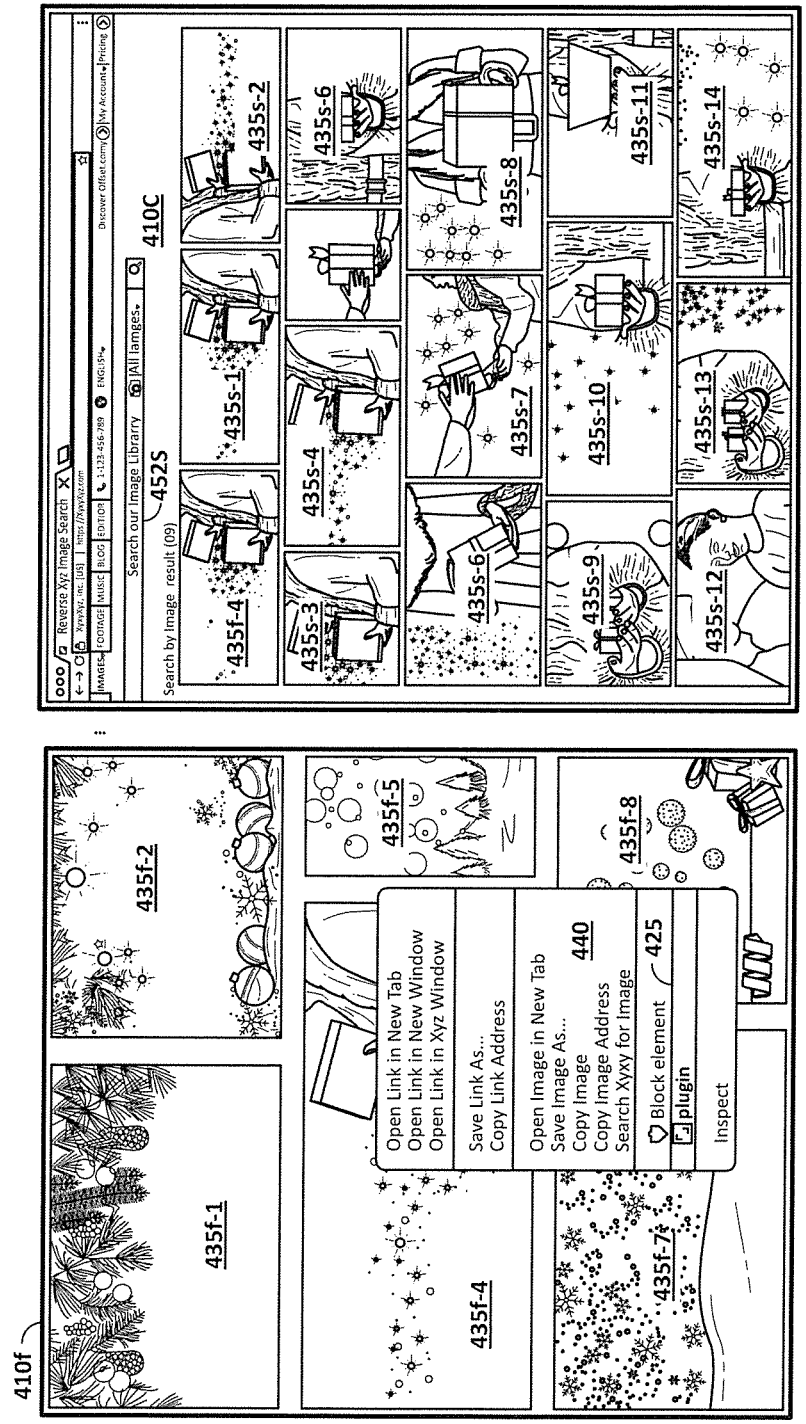

FIG. 4C illustrates a fragment of web page 410f, including images 435f-1 through 435f-8 (hereinafter, collectively referred to as "images 435f"). The user may right click on image 435f-4 to display a menu 440 wherein the user may activate an application element 425 for the application handled by the server hosting second image database 452s. As a result, the application displays a new browser tab 410C, including images 435s-1 through 435s-14 (hereinafter, collectively referred to as "images 435s"), from second image database 452s, which are visually similar to image 435f-4. When the user has more than a couple hundred images in the license history, the system may display several pages to the user for selection. Accordingly, images 435s are visually similar to images 435f, with the added feature of being licensed according to the license agreements subscribed by the second image database, rather than the restricted licenses 455. In some embodiments, the system pages through the entire license history log through a universal resource location (URL) accessed by the user with the client device. When the user only desires one image in the license history log to be searched, the user may right-click on the selected image to activate the application element. In some embodiments, application element 425 (e.g., "stock swap" plugin) may allow the user to add or exclude features from the images in second image database 452s, which are presented in the results page. For example, the user may decide that the reverse image search be performed on images that include a sunset, the beach, or exclude people, in the results found from first image database 452f. In some embodiments the number of similar images presented to the user from second image database 452s may be five, six, or even more, sorted in terms of similarity (e.g., shortest to longest distance D 353). For example, in some embodiments browser tab 410C may include one or more pages so that the user can review "next" pages of selected, similar images in second image database 452s.

Figure 4D:
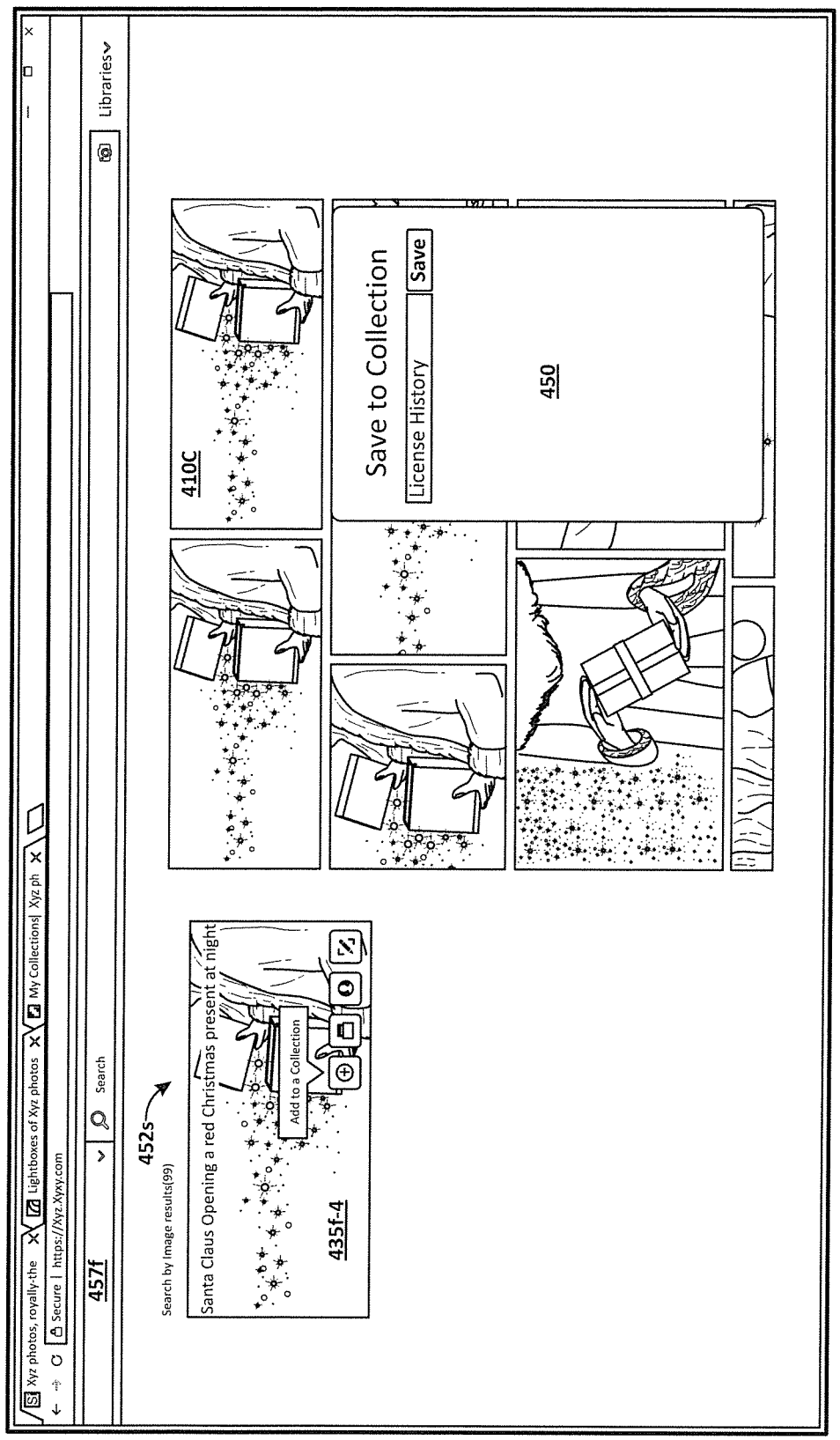

FIG. 4D illustrates a step in which the user adds images to a collection in second image database 452s. Accordingly, application 422 may open a dialog window 450 wherein the user may select a location in second image database 452s in which to store the new set of images from second image database 452s that are visually similar to a selected image in first image database 454f (e.g., image 435f-4).

FIGS. 5A-D illustrate a walk-through access of an application element in an application for migrating images from a first database to a second database, according to some embodiments. In some embodiments, an application 522 for migrating images from a first image database to a second image database may include a browser application element 525 configured to activate the image migration when the user has accessed a web page for the first image database through a browser. A user can activate the application element on a web page of the first image database that includes a user's licensing history. Upon activation of the application element, a browser screen containing images from the second image database and that are visually similar to the user's licensing history in the first image database appears on display. The user can then select the images in the second image database and save the selected images to a user account therein. In some embodiments, a front-end component of this tool analyzes and collects all, or almost all images presented on a web page of the first image database. A back-end component of the tool receives image data and executes reverse image search against images in the second image database and returns the most visually similar results for display in the frond-end. This tool is configured to work on any web page that includes multiple images.

Figure 5A:
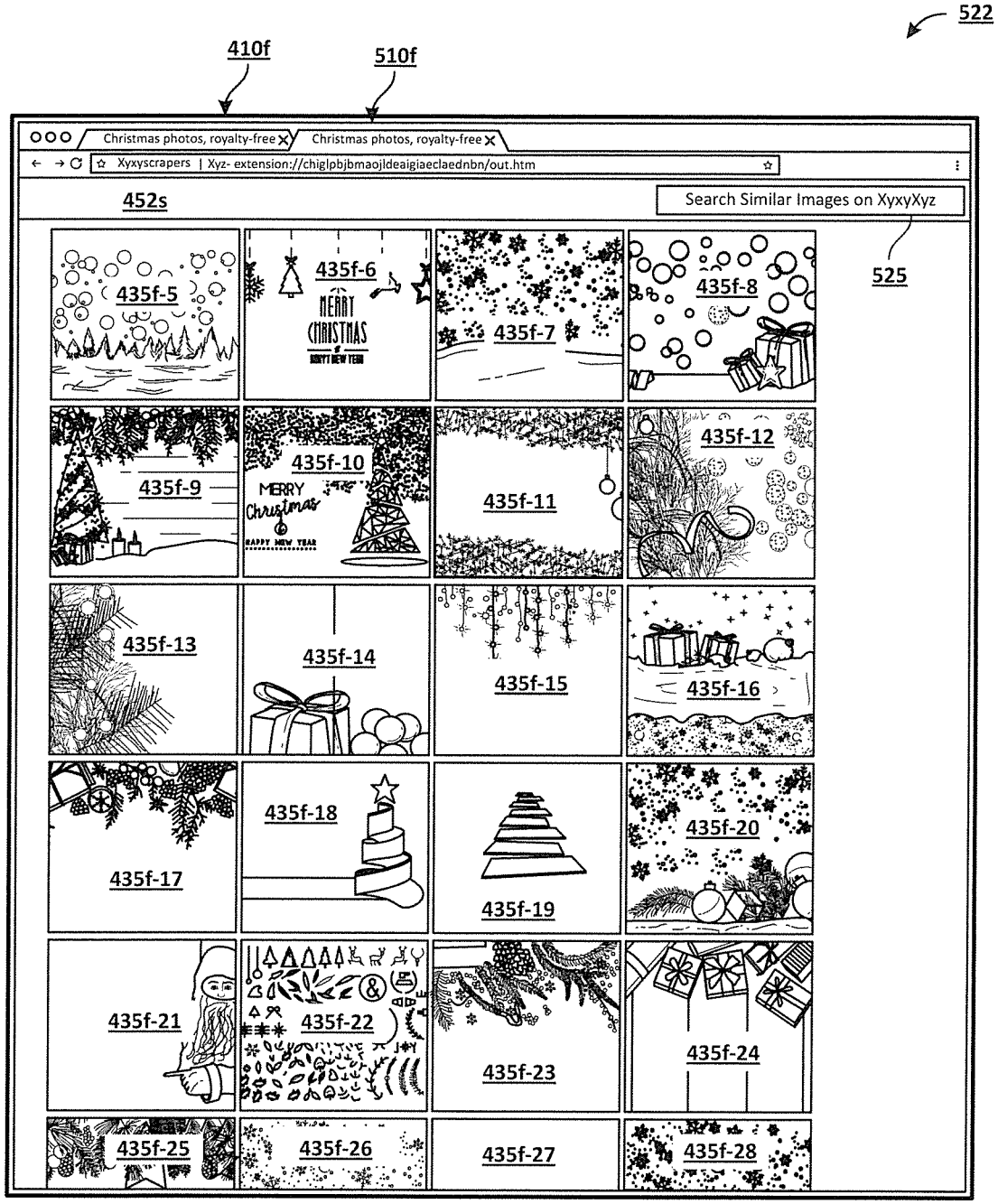
FIGS. 5A-D illustrate a walk-through access of an application element in a browser application for migrating images from a first database to a second database, according to some embodiments.
Figure 5B:
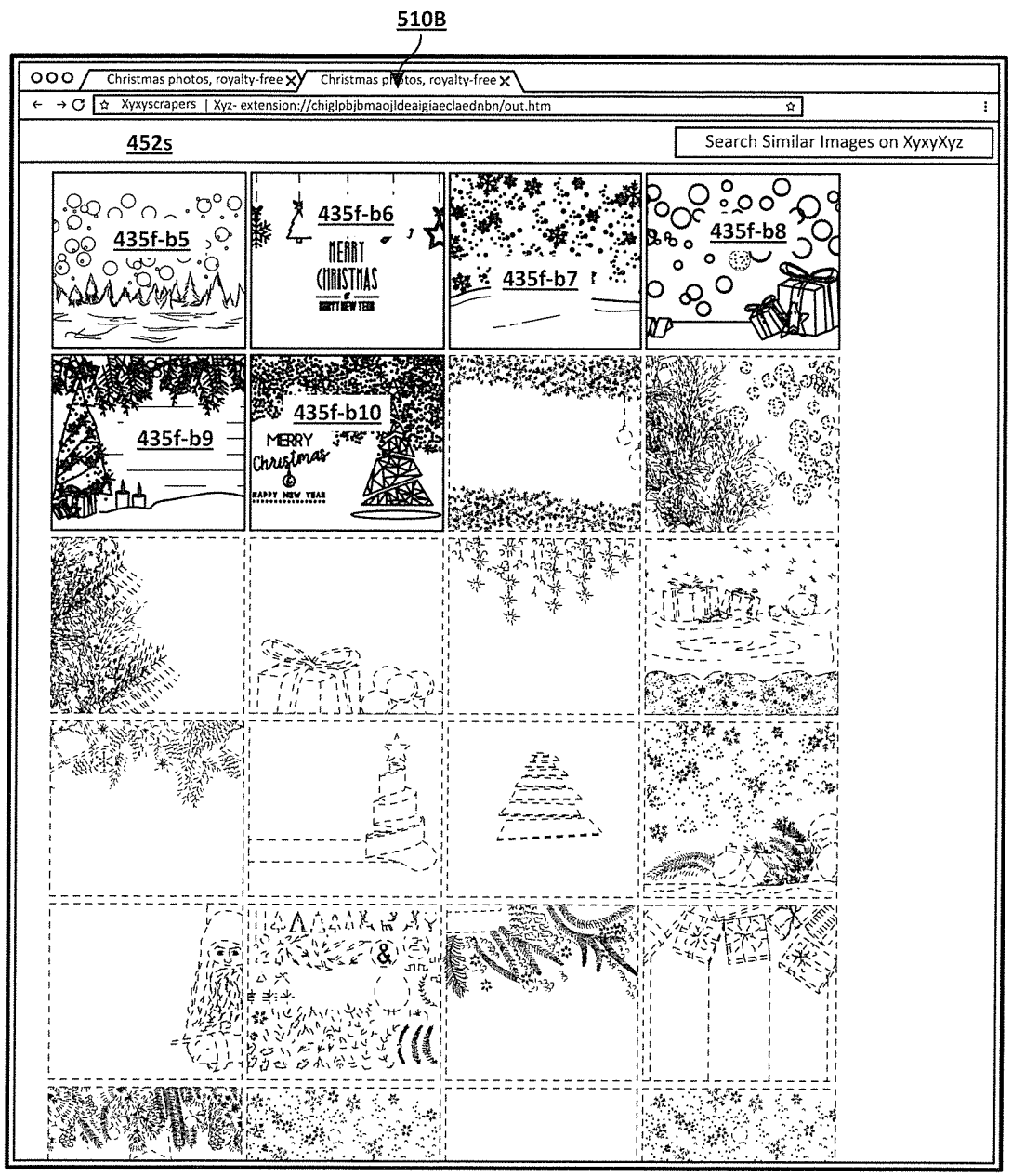
Figure 5C:
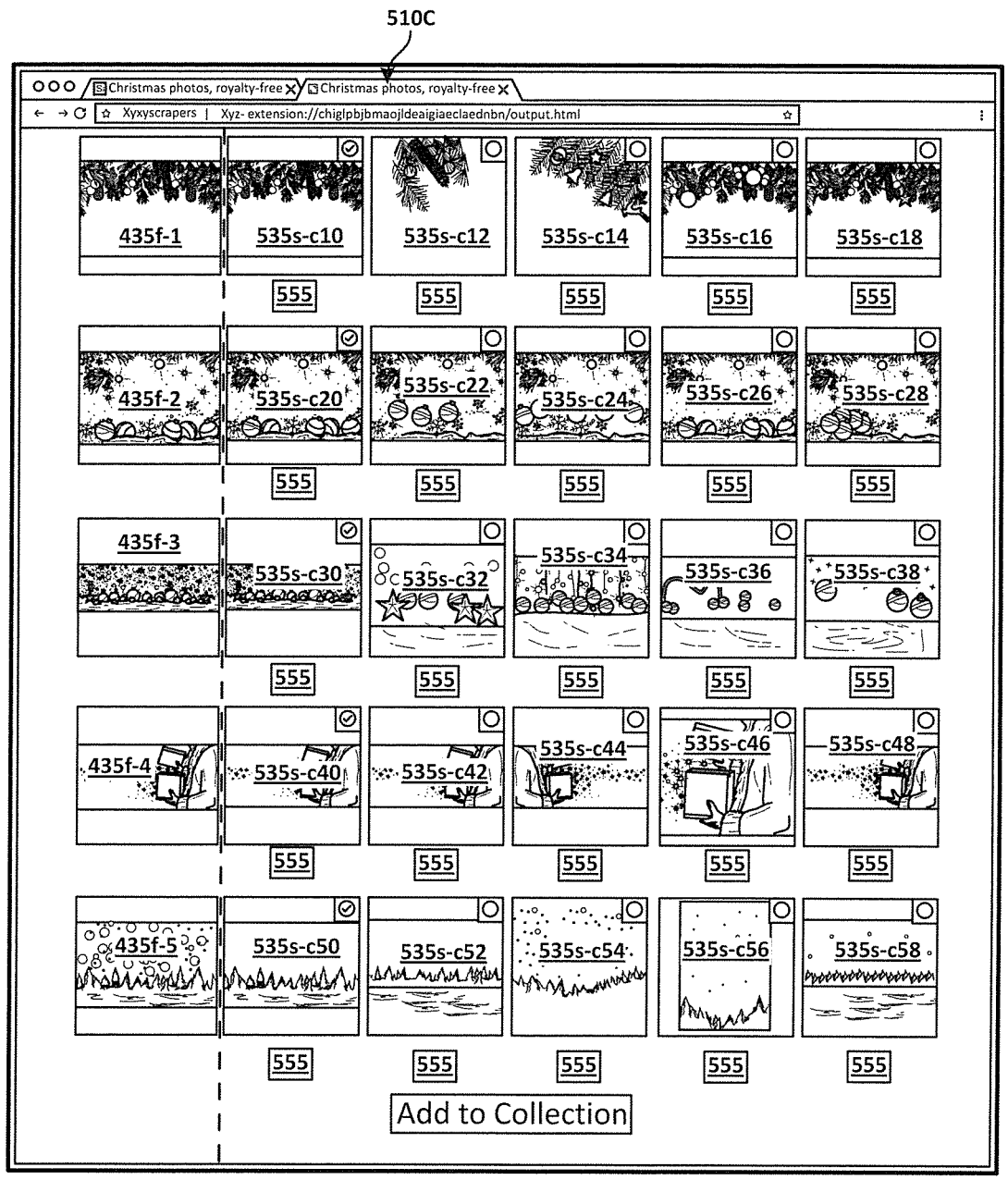

FIG. 5A illustrates a web page 510f of first image database 452f where the application element is activated. Accordingly, the user activates the application element by clicking on it from the browser (e.g., from web page 410f), then a list of images 435f-5 through 435f-28, extracted from the web page, is presented in a separate browser tab (hereinafter, collectively referred to as "images 435f"). In some embodiments, application 522 extracts images 435f from a license history associated with the user in the first image database:

In FIG. 5B, the user has selected images 535f-b5 through 535f-b10 (collectively referred to, hereinafter, as "images 535-fb"), to be migrated from first image database 452f to second image database 452s. The system performs a reverse image search as the user clicks on each image 535-b5 through 535f-b10:

FIG. 5C illustrates the result of the reverse image search for each of the first five images 435f. The user can click the "Search" button, then a list of similar images found in second image database 454s for each target image is presented, the user selects desired images to be added to a user collection in second image database 452s. Accordingly, a browser page 510C displays images 535s-c10 through 535s-c18, from second image database 452s, that are visually similar to image 435f-1 from the first image database. Likewise, images 535s-c20 through 535s-c28, from second image database 452s, are visually similar to image 435f-2 from first image database 452f. Images 535s-c30 through 535s-c38, from second image database 452s, are visually similar to image 435f-3 from first image database 452f. Images 535s-c40 through 535s-c48, from second image database 452s, are visually similar to image 435f-4 from first image database 452f. And images 535s-c50 through 535s-c58, from second image database 452s, are visually similar to image 435f-5 from first image database 452f. Images 535s-c10 through 535s-c58 above will be collectively referred to, hereinafter, as "images 535sc." In some embodiments, browser page 510C includes a "view image" button 555, so that the user may inspect more closely any one of images 535sc from second image database 452s, and select, download, or modify it accordingly.

Figure 5D:
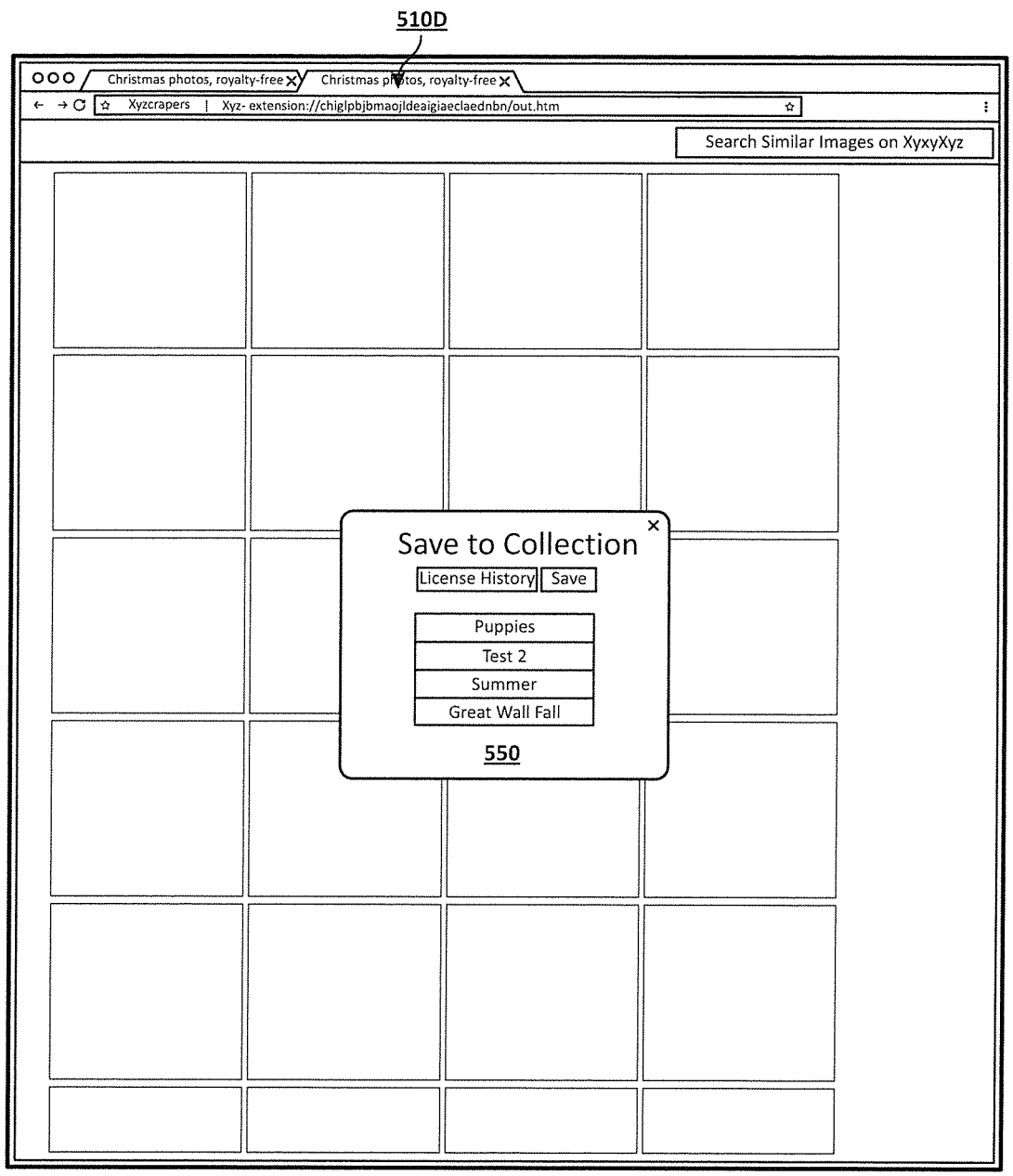

FIG. 5D is a screen shot 510D of a save field 550 where the user is prompted to select a location in second image database 452s where the selected images may be stored.

Figure 6:
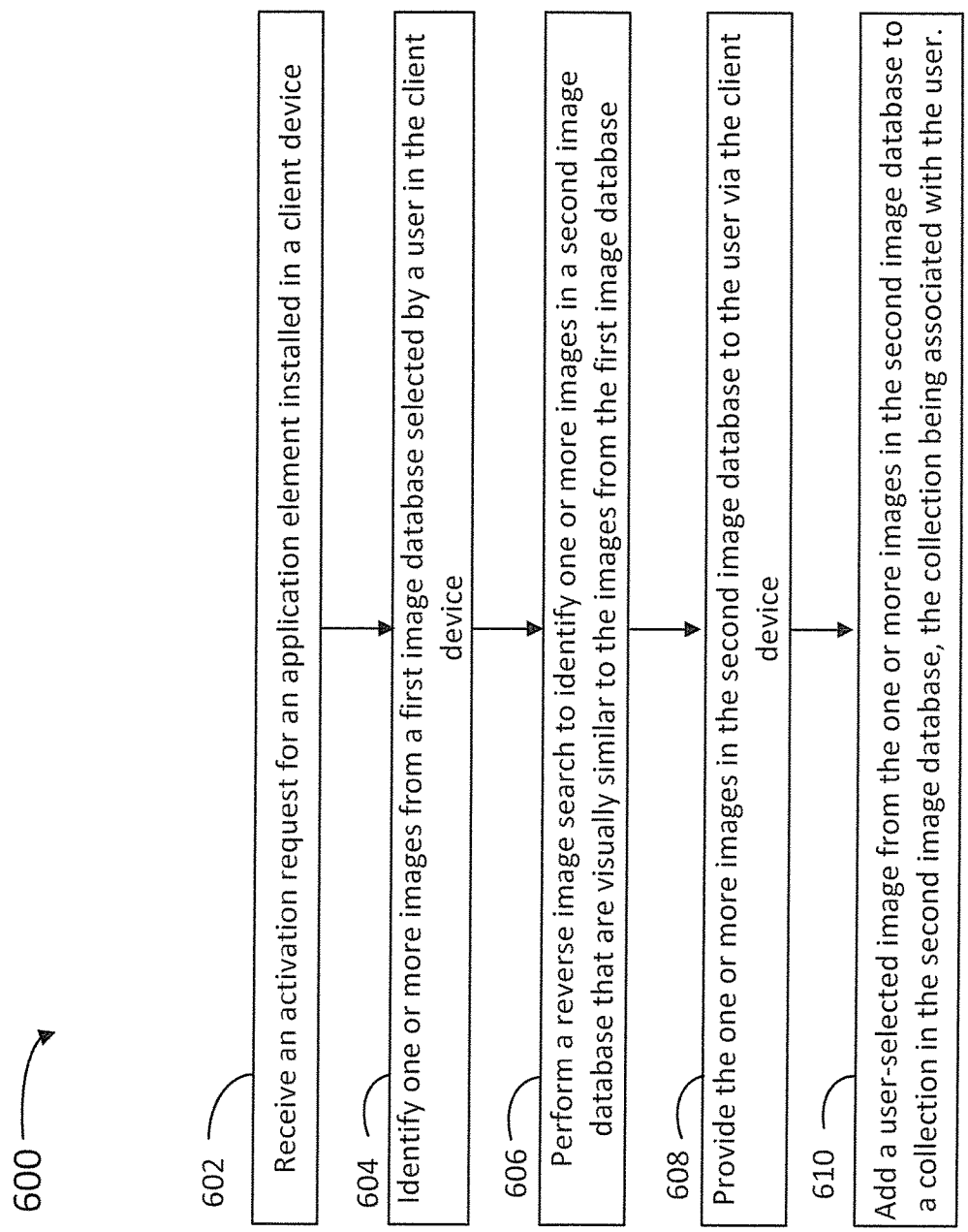
FIG. 6 is a flow chart illustrating steps in a method for migrating an image history of a user from a first database to a second database, according to some embodiments.

FIG. 6 is a flow chart illustrating steps in a method 600 for migrating an image history of a user from a first database to a second database, according to some embodiments. Method 600 may be performed at least partially by any one of network servers hosting a collection of images, videos, and multimedia files (e.g., images and video clips), while communicating with any one of a plurality of client devices (e.g., any one of servers 130 and any one of client devices 110). The client devices may be handled by a user, wherein the user may be registered to a private account with the server, or may be a visitor to the server website or logged in a server application and an application element installed in the client device (e.g., applications 222, 422, and 522, and application elements 225, 425, and 525). At least some of the steps in method 600 may be performed by a computer having a processor executing commands stored in a memory of the computer (e.g., processors 212 and 236, memories 220 and 232). Further, steps as disclosed in method 600 may include retrieving, editing, and/or storing files in a database that is part of, or is communicably coupled to, the computer, using, inter-alia, an image search engine (e.g., image search engine 242). The database may include any one of an image database, a history log, and an embedded space (e.g., image databases 252 and 452, history log 254, and embedded space 230). Methods consistent with the present disclosure may include at least some, but not all of, the steps illustrated in method 600, performed in a different sequence. Furthermore, methods consistent with the present disclosure may include at least two or more steps as in method 600 performed overlapping in time, or almost simultaneously.

Step 602 includes receiving an activation request for an application element installed in a client device. In some embodiments, the application element is an executable script in an application installed in the client device, and step 602 includes handling the application from a remote server. In some embodiments, step 602 includes receiving the activation request from a web browser accessing a webpage for the first image database. In some embodiments, step 602 includes receiving the activation request when the user selects one or more images from the first image database. In some embodiments, step 602 includes receiving a selection, from the user via the application element, of at least one feature to include or exclude from an image in the second image database.

Step 604 includes identifying one or more images from a first image database, selected by a user in the client device. In some embodiments, step 604 includes inspecting the first image database according to a filter, and wherein the filter excludes an image from the first image database that has a size below a selected threshold. In some embodiments, step 604 includes selecting images in the first image database within a personal licensing history for the user with the first image database. In some embodiments, step 604 may include one or more images specifically selected by the user from a license history log in the first image database. In some embodiments, step 604 may include receiving, from the application installed in the client device, a "select all" request from the user, so that all, or almost all of the images in the user license history log from the first image database are identified for a reverse image search.

Step 606 includes performing a reverse image search to identify one or more images in a second image database that are visually similar to the images from the first image database. In some embodiments, the one or more images in the first image database have a first license of use agreement controlled by a first server, and the one or more images in the second image database have a second license of use agreement controlled by a second server. Further, in some embodiments step 606 includes verifying that the user has access to the second license of use agreement. In some embodiments, step 606 includes embedding a first image vector associated with the one or more images from the first image database in a multidimensional embedded space that includes a second image vector associated with the one or more images in the second image database, and finding a cosine distance between the first image vector and the second image vector. In some embodiments, step 606 includes finding a degree of a style classification for the image from the first image database using a neural network algorithm that is trained on an image search history for the second image database.

Step 608 includes providing the one or more images in the second image database to the user, via the client device.

Step 610 includes adding a user-selected image from the one or more images in the second image database to a collection in the second image database, the collection being associated with the user.

Figure 7:
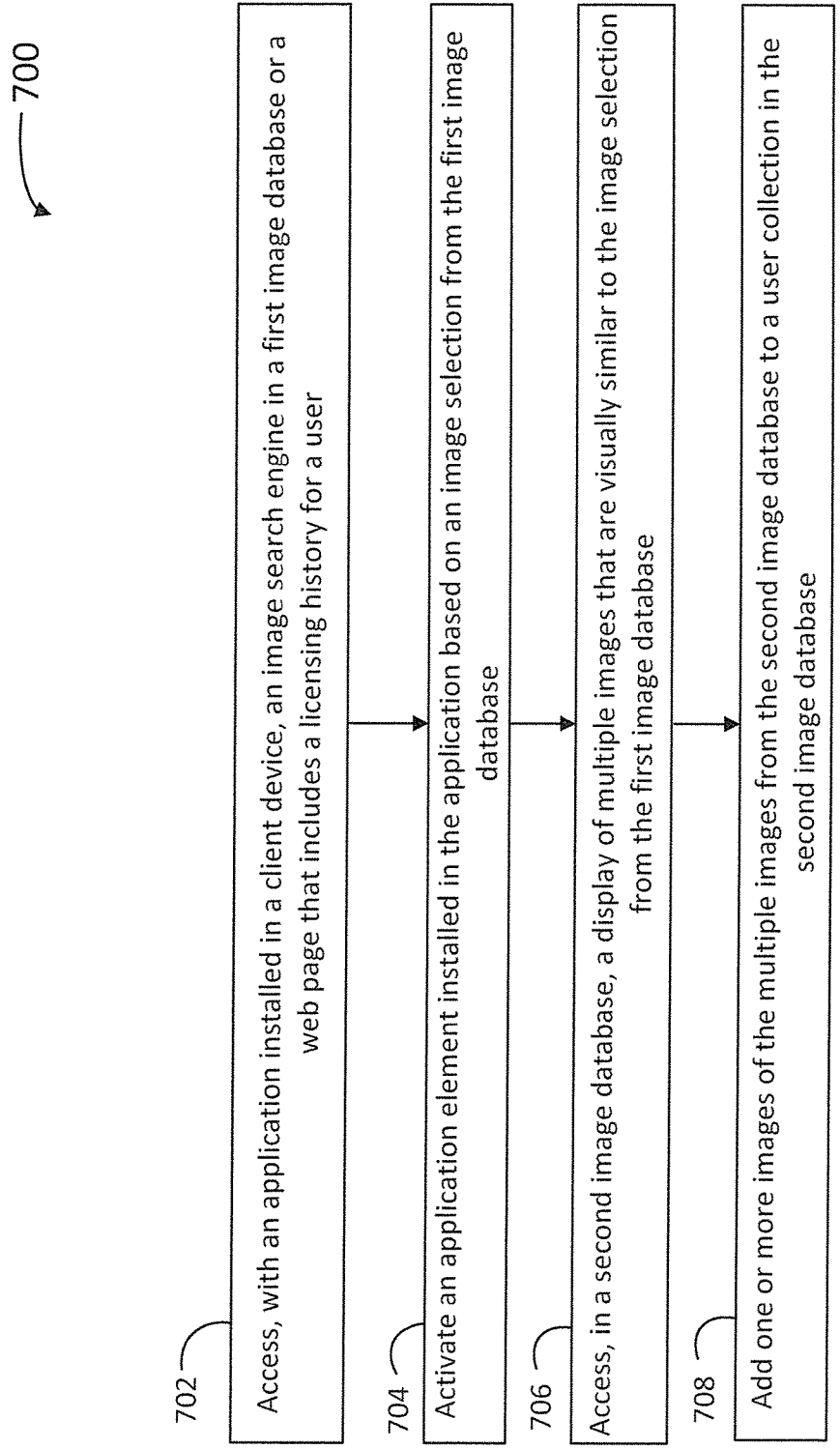
FIG. 7 is a flow chart illustrating steps in a method for migrating an image history from a personal account in a first database to a personal account in a second database, according to some embodiments.

FIG. 7 is a flow chart illustrating steps in a method 700 for migrating an image history from a personal account in a first database to a personal account in a second database, according to some embodiments. Method 700 may be performed at least partially by a user with any one of a plurality of client devices (e.g., any one of servers 130 and any one of client devices 110), and communicating with any one of a plurality of network servers hosting a collection of images, videos, and multimedia files (e.g., images and video clips). The client devices may be handled by a user, wherein the user may be registered to a private account with the server, or may be a visitor to the server website or logged in a server application and an application element installed in the client device (e.g., applications 222, 422 and 522, and application elements 225, 425, and 525). At least some of the steps in method 700 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer, using, inter-alia, an image search engine (e.g., image search engine 242). The database may include any one of an image database, a history log, and an embedded space (e.g., image databases 252 and 452, history log 254, and embedded space 230). Methods consistent with the present disclosure may include at least some, but not all of, the steps illustrated in method 700, performed in a different sequence. Furthermore, methods consistent with the present disclosure may include at least two or more steps as in method 700 performed overlapping in time, or almost simultaneously.

Step 702 includes accessing, with a browser application in the client device, an image search engine in a first image database or a web page of the first image database that includes a licensing history for the user.

Step 704 includes activating an application element installed in the browser based on an image selection from the first image search database. In some embodiments, Step 704 includes activating the application element installed in a web browser to perform an image migration from a selected web page associated with the first image database. In some embodiments, step 704 includes activating the application element from a web page associated with the first image database to perform an image migration of multiple images from the web page to the second image database. In some embodiments, step 704 may include activating a "select all" tab in the application element, so that all, or almost all of the images in the user license history log from the first image database are selected for a reverse image search.

Step 706 includes accessing a new browser tab that displays visually similar images to the image selection from the first image database, wherein the visually similar images belong in a second image database. In some embodiments, step 706 includes accessing a new browser tab including a history list of images extracted by the user from the first image database.

Step 708 includes adding one or more images from the new browser tab to a user collection in the second image database. In some embodiments, step 708 includes selecting at least one image from the history list of images to perform a reverse image search in the second image database. In some embodiments, step 708 includes adding a requested feature for the images in the second image database.

Hardware Overview

Figure 8:
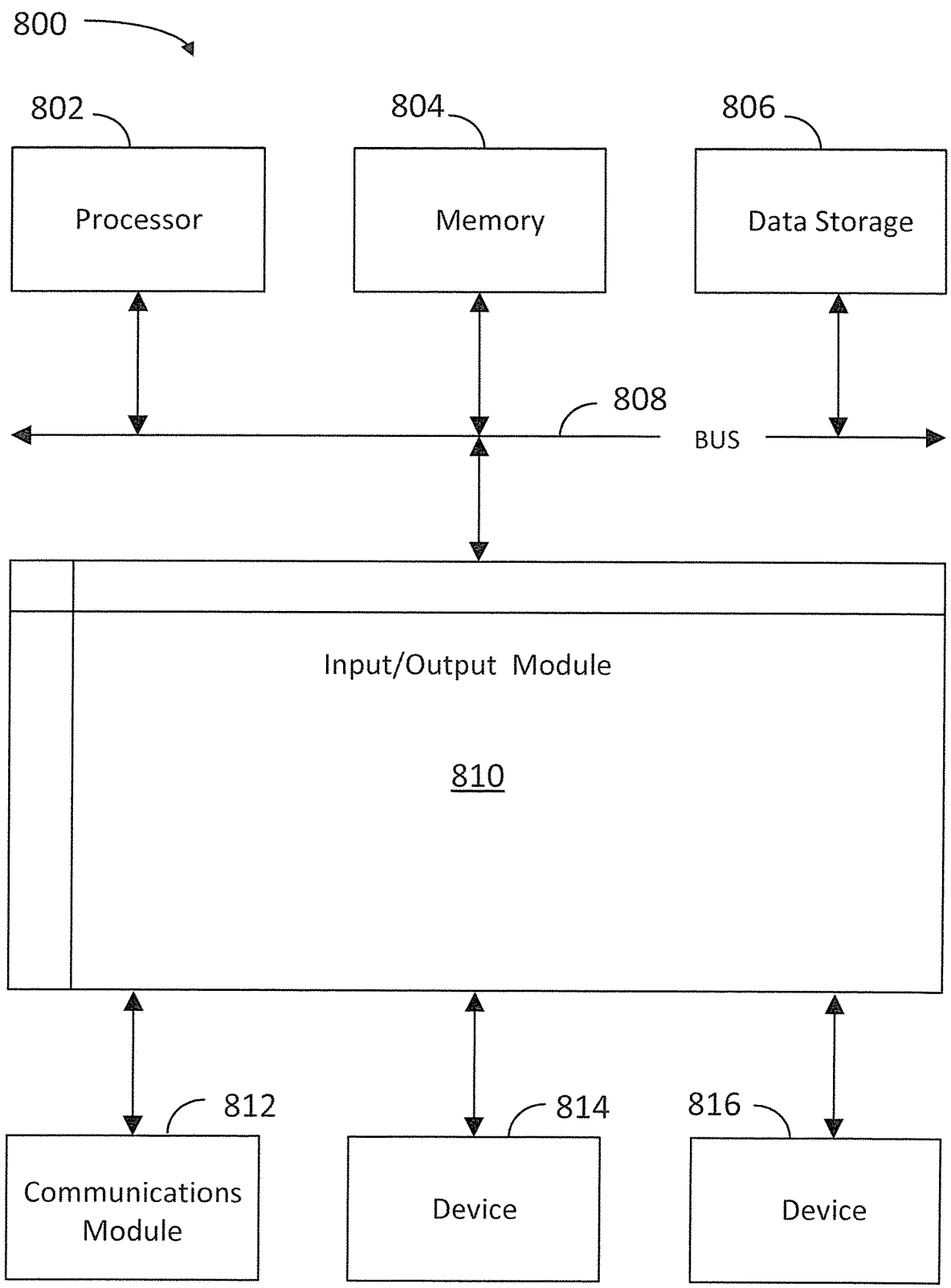
FIG. 8 is a block diagram illustrating an example computer system with which the client and server of FIGS. 1 and 2 and the methods of FIGS. 6 and 7 can be implemented.

FIG. 8 is a block diagram illustrating an exemplary computer system 800 with which the client 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results.

The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving an activation request for an application element installed in a client device;
identifying one or more images from a first image database selected by a user in the client device;
performing a reverse image search to identify one or more images in a second image database that are visually similar to the one or more images from the first image database, the reverse image search comprising:
embedding a first image vector associated with the one or more images from the first image database in a multidimensional embedded space that includes a second image vector associated with the one or more images in the second image database, and
finding a distance between the first image vector and the second image vector;
providing the one or more images in the second image database to the user via the client device; and
adding a user-selected image from the one or more images in the second image database to a collection in the second image database, the collection being associated with the user.

2. The computer-implemented method of claim 1, wherein the one or more images in the first image database have a first license of use agreement controlled by a first server, and the one or more images in the second image database have a second license of use agreement controlled by a second server, further comprising verifying that the user has access to the second license of use agreement.

3. The computer-implemented method of claim 1, wherein receiving an activation request for an application element comprises receiving the activation request from a web browser accessing a webpage for the first image database.

4. The computer-implemented method of claim 1, wherein receiving an activation request for an application element further comprises receiving a selection, from the user via the application element, of at least one feature to include or exclude from an image in the second image database.

5. The computer-implemented method of claim 1, wherein the application element is an executable script in an application installed in the client device, and wherein receiving an activation request comprises handling the application from a remote server.

6. The computer-implemented method of claim 1, wherein receiving an activation request for an application element comprises receiving the activation request when the user selects one or more images from the first image database.

7. The computer-implemented method of claim 1, wherein identifying one or more images from a first image database comprises inspecting the first image database according to a filter, and wherein the filter excludes an image from the first image database that has a size below a selected threshold.

8. The computer-implemented method of claim 1, wherein performing a reverse image search to identify one or more images in a second image database comprises filtering images in the first image database based on a user's licensing history with the first image database, and finding a second image in the second image database that is close to a filtered image based on the distance between the first image vector and the second image vector.

9. The computer-implemented method of claim 1, wherein performing a reverse image search to identify one or more images in a second image database comprises finding a degree of a style classification for an image from the first image database using a neural network algorithm that is trained on an image search history for the second image database.

10. The computer-implemented method of claim 1, wherein identifying one or more images from a first image database comprises selecting images in the first image database within a personal licensing history for the user with the first image database.

11. A system comprising:
one or more processors; and
a memory coupled to the one or more processors, the memory including instructions that, when executed by the one or more processors, cause the one or more processors to:
receive an activation request for an application element installed in a client device;
identify one or more images from a first image database selected by a user in the client device;
perform a reverse image search to identify one or more images in a second image database that are visually similar to the one or more images from the first image database, wherein to perform a reverse image search to identify one or more images in a second image comprises:
to embed a first image vector associated with the one or more images from the first image database in a multidimensional embedded space that includes a second image vector associated with the one or more images in the second image database, and
to find a distance between the first image vector and the second image vector;
provide the one or more images in the second image database to the user via the client device; and
add a user-selected image from the one or more images in the second image database to a collection in the second image database, the collection being associated with the user.

12. The system of claim 11, wherein the one or more images in the first image database have a first license of use agreement controlled by a first server, and the one or more images in the second image database have a second license of use agreement controlled by a second server.

13. The system of claim 11, wherein the application element is an executable script in an application installed in the client device, and wherein to receive an activation request the one or more processors execute instructions to handle the application in a remote server.

14. The system of claim 11, wherein to perform a reverse image search to identify one or more images in a second image database the one or more processors execute instructions to filter images in the first image database based on a user's licensing history with the first image database, and to find a second image in the second image database that is close to a filtered image based on the distance between the first image vector and the second image vector.

15. The system of claim 11, wherein to perform a reverse image search to identify one or more images in a second image database the one or more processors execute instructions to find a degree of a style classification for an image from the first image database using a neural network algorithm that is trained on an image search history for the second image database.

16. The system of claim 11, wherein to identify one or more images from a first image database the one or more processors execute instructions to inspect the first image database according to a filter, and wherein the filter excludes an image from the first image database that has a size below a selected threshold.

17. The system of claim 11, wherein to receive an activation request for an application element the one or more processors execute instructions to receive the activation request from a web browser accessing a webpage for the first image database.

18. A computer-implemented method comprising:
accessing, with an application installed in a client device, an image search engine in a first image database, wherein the first image database comprises a licensing history for a user;
activating an application element installed in the application based on an image selection from the first image database;
accessing, in a second image database, a display of multiple images that are visually similar to the image selection from the first image database by:
embedding a first image vector associated with the one or more images from the first image database in a multidimensional embedded space that includes a second image vector associated with the one or more images in the second image database, and
finding a distance between the first image vector and the second image vector; and
adding one or more images from the second image database to a user collection in the second image database.

19. The computer-implemented method of claim 18, wherein activating the application element installed in the application further comprises activating the application element from a web page associated with the first image database to perform an image migration of multiple images from the web page to the second image database.

20. The computer-implemented method of claim 18, further comprising adding a requested feature for the images in the second image database.

* * * * *